UNITED STATES PATENT OFFICE.

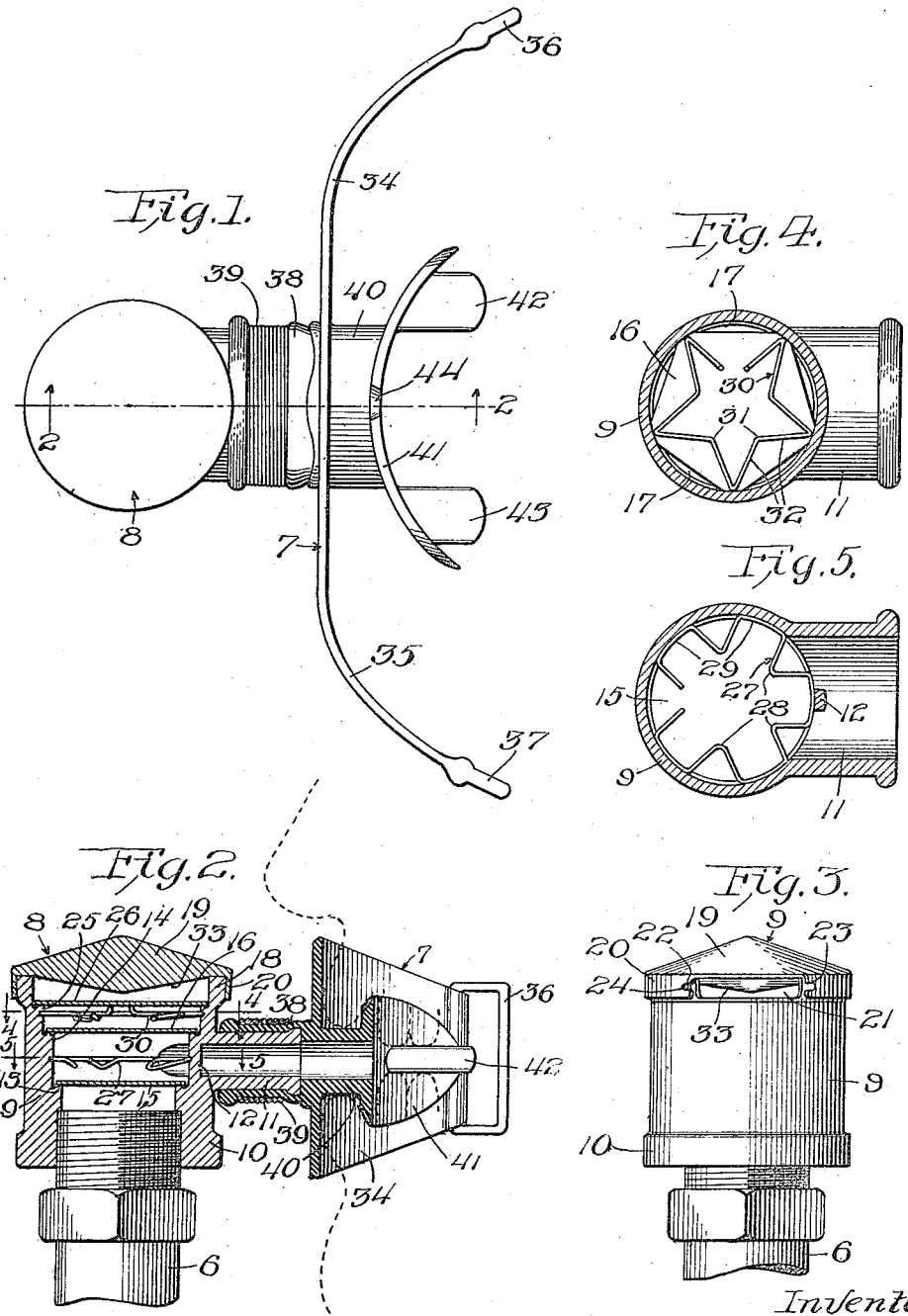

PAUL A. R. CONRAD, OF CHICAGO, ILLINOIS, ASSIGNOR TO LIFE SAVING DEVICES COMPANY, OF CHICAGO, ILLINOIS, A CORPORATION OF DELAWARE.

RESPIRATING APPLIANCE.

1,266,410.		Specification of Letters Patent.		Patented May 14, 1918.

Application filed June 5, 1917. Serial No. 172,986.

*To all whom it may concern:*

Be it known that I, PAUL A. R. CONRAD, a citizen of the United States, residing at Chicago, county of Cook, and State of Illinois, have invented certain new and useful Improvements in Respirating Appliances, of which the following is a specification.

The present invention has to do with certain improvements in respiratory appliances and the like. The invention has to do with appliances of this type intended for use particularly by men working in dangerous localities where there is danger of suffocation. For example, devices embodying the features of the present invention are used by workmen repairing gas leaks, or ammonia leaks, or who find it necessary to enter rooms or chambers filled with smoke or noxious gases. The features of the invention are also well adapted for use in many classes of industrial plants, such as chemical plants and the like. Devices embodying features of the present invention are very well adapted for use in these various classes of service, as well as other classes of service which will appear from a study of the features of construction and invention to be hereinafter disclosed.

One of the objects of the invention is to provide a respirating apparatus which can be very conveniently used with a long hose or tube through which fresh air may be inhaled by the operator without the necessity of providing special pumping apparatus to supply fresh air under pressure.

Another object of the invention is to so construct the respiratory apparatus that the possibility of failure of operation at a critical time will be minimized, so as to render as certain as possible the correct and perfect operation of the mechanism at all times when the same is in actual service.

Another object is to provide a very simple construction of mechanism and one which can be very cheaply manufactured and which will remain in serviceable or operable condition with the least possible attention.

Other objects and uses of the invention will appear from a detailed description of the same which consists in the features of construction and combinations of parts hereinafter described and claimed.

In the drawing:

Figure 1 shows a plan view of one form of apparatus embodying the features of the present invention;

Fig. 2 shows a section taken on the line 2—2 of Fig. 1, looking in the direction of the arrows, the operator's face being shown by dotted lines;

Fig. 3 shows an end elevation of the device shown in Figs. 1 and 2;

Fig. 4 shows a section taken on the line 4—4 of Fig. 2, looking in the direction of the arrows; and Fig. 5 shows a section taken on the line 5—5 of Fig. 2, looking in the direction of the arrows.

The respirating apparatus illustrated in the drawings comprises a hose 6 through which the fresh air is inhaled from a distant point, a mouth-piece 7 which may be conveniently attached to the head of the operator, and a valve mechanism whereby the breathing of the operator causes an inhalation of fresh air from the hose or tube 6 and an exhalation of the foul air and gases from the operator into the immediately adjacent atmosphere.

The valve mechanism is conveniently formed as a circular or tubular casing 9 having a hose connection 10 on its lower end, and a sidewise projecting arm 11 on one side. This arm is hollow and communicates with the central interior portion of the circular chamber 9, as shown in Fig. 5. A rib or post 12 extends vertically across the inner end of the passage in the arm 11 so as to reinforce the structure at this point without, however, interfering with a free flow of air back and forth through said passage.

The member 9 is provided with a circular valve seat 13 just below the passage of the member 11 and with another valve seat 14 just above said passage. Both of these valve seats face upwardly. A disk valve 15 rests on the valve seat 13 and a disk valve 16 rests on the valve seat 14. The valve 15 may rise sufficiently to permit a free flow of air upwardly from the hose or tube 6 into the passage of the arm 11 when the operator inhales, the valve 16 remaining closed at such time. The valve 16 bears such relationship to the interior of the casing 9 and to the seat 14, that, when the operator exhales or respires, the air can pass out around the periphery of the valve 16 when said valve rises away from the seat 14, without interference from the interior surface of the wall of the casing 9. The form of valve 16 shown in Fig. 4 is one in which portions of the periphery of the said valve are cut away so as to provide the spaces 17 around its periphery.

In its upper portion, the casing 9 is provided with a circular finished flange or the like 18, whereon is mounted a cap 19 having a downwardly depending flange 20. This flange 20 seats nicely on the flange 18, although the fit at this point is such that the cap 19 can be turned on the flange 18, if desired. Portions of the flanges 18 and 20 are cut away, so that, when said cutaway portions register, there is provided a passage 21, as shown in Fig. 3, through which the air is expelled when the operator exhales. A pin 22 is seated in the flange 18 at one side of said opening, and the flange 20 has the notches or recesses 23 and 24 formed at the ends of its cutaway portion. When the cap is turned into the position shown in Fig. 3, the notch 24 engages the pin 22, so as to limit the cap against further movement in that direction, and also to lock the cap in place on the valve member. Upon turning the cap in the other direction, the notch 23 will engage the pin 22 when the opening 21 has been entirely closed.

Ordinarily the single exhaling valve 16 will be sufficient to adequately protect the operator against the possible inflow of foul air or gases which surround him. In order to provide ample precaution in this regard, however, I have illustrated another circular valve seat 25 somewhat above the valve seat 14, the valve resting on said valve seat 25 in the manner shown in Fig. 2. With this arrangement, it is necessary for the exhaled air to pass both of the valves 16 and 26 when expelled by the operator, and in like manner the operator is doubly protected because when he inhales, it is entirely probable that at least one of the valves 16 or 26 will accurately seat so as to prevent an inflow of foul gas or fumes to the operator.

The valves 15, 16, and 26 may, of course, be made of any desirable material, but sheet aluminum will be found to be very desirable for this work because of its lightness. It will be found that ordinarily these valves will not rise parallel to their original position, but, on the contrary, they will tilt upward, one portion of their edges rising faster than the other portions. This is because the inflowing or outflowing air will travel by the shortest route possible, or at any rate, the route of least resistance.

Examination of Fig. 2 in particular will show that the valve seats 13, 14, and 25 are countersunk or tapered downwardly and outwardly. This taper corresponds in a general way to the tilt which the valves will assume as they rise to permit the flow of air. Furthermore, by countersinking the valve seats in this manner, assurance is had of a very perfect seating of the valves each time they operate.

In order to limit the movement of the valves, I have provided the constructions which I will now describe. Above the valve 15 is a wire member 27 whose form is best shown in Fig. 5. This member has a plurality of angles or pointed portions 28 in conjunction with the intermediate portions 29 which seat into a circular recess in the wall of the chamber 9. The pointed portions 28 are bent or deflected downwardly somewhat, so that, as the valve 15 rises, it will contact these portions and be limited in its movement by one or more of them. Since this member 27 is made of wire, it can be very easily sprung into place within the casing, or removed therefrom upon occasion. Another member 30 also formed of wire is located above the valve 16. This member 30 has a plurality of angular or pointed portions 31 which also tilt or deflect downwardly, and serve to limit upward movement of the valve 16. It also has a plurality of pointed portions 32 which seat into a circular recess in the hood of the casing 9.

The cap 19 has its lower surface 33 of tapered or cone-shaped formation, the taper thereof corresponding in a general way to the angle on which the valve 26 may be expected to rise as it operates.

The mouth piece 7, which was previously referred to, is preferably made of soft rubber and is so formed that it can be very readily and effectively attached to the operator's head and held in position in his mouth. For this purpose, the same comprises a pair of relatively wide flaps 34 and 35 which may lie against the cheeks of the operator, these flaps being provided with the eyelets 36 and 37 through which is passed a strip which extends around the back of the operator's head. A tubular portion 38 of soft rubber passes over the outer surface of the arm 11 and is secured thereto by a cord or the like 39. A soft rubber hollow extension 40 extends inwardly from the tubular portion 38 and terminates in an arcuate flange 41. This flange is of soft rubber and is of such size that it can be conveniently received between the gums and lips of the operator's mouth. The lips themselves are supposed to come down against the tubular extension 40 when the operator closes his mouth with the flange 41 in place. A pair of rubber lugs 42 and 43 extend inwardly from the flange 41, and when the operator closes his mouth, his teeth are brought down on these lugs so as to grip them and hold the device solidly in place.

It will be found that, after the device has been used for a very short time, the saliva from the operator's mouth will run along the passageway into the casing 9 and fill the counterbores of certain of the valve seats, so as to greatly improve the air-tight or gas-tight operation of said valves. I point out this fact because it has previously been thought that the saliva would interfere with a proper functioning of the valves, whereas I have found that, with the construction herein disclosed, their action is improved thereby.

I also point out the fact that the edges of the flange 41 are tapered or "feather-edged," so that they seat nicely between the gums and lips of the operator. Also, examination of Fig. 1, will show the presence of a notch 44 in the central portion of the upper part of the flange. This notch accommodates the cord between the center portion of the upper gum and the upper lip. A similar notch is provided in the lower portion of the flange for the accommodation of the cord between the center portion of the lower gum and the lower lip.

While I have herein shown and described only a single embodiment of my invention, still I do not limit myself to the said embodiment, except as I may do so in the claims.

I claim:

1. In a device of the class described, the combination with a hose, of a cylindrical chambered member having a vertical bore extending throughout its length, a sidewise projecting arm having a horizontal bore in communication with the aforesaid vertical bore, a horizontal circular valve seat within the casing at a point below the point of junction of the horizontal and vertical bores, another horizontal circular valve seat in the casing at a point above the aforesaid point of junction, and a third horizontal circular valve seat within the casing at a point above the last mentioned valve seat, the valve seats being of progressively increasing diameter from the first mentioned valve seat to the last mentioned valve seat, a disk valve located on each of said valve seats, there being a segmental notch in the upper portion of the casing at a point above the last mentioned valve seat and its valve, a cap having a downwardly depending flange adapted to seat onto the upper portion of the member, there being a segmental slot in said flange adapted to register with the slot of the member and a suitable mouth piece on the aforesaid sidewise projecting arm, substantially as described.

2. In a device of the class described, the combination of a cylindrical chambered member having a vertical bore and a horizontal bore in communication therewith, a hose connection on the lower end of said member, a pair of horizontal valve seats within the member located, respectively, above and below the point of junction of the vertical and horizontal bores, a disk valve on each of said valve seats, and a limit device above each of the disk valves, each limit device comprising a flexible wire suitably formed to present a series of downwardly facing contact points and a series of wall engaging portions for engagement with the wall of the chambered member, substantially as described.

3. In a device of the class described, the combination of a cylindrical chambered member having horizontal and vertical bores in communication with each other, a pair of horizontal valve seats within said member located, respectively, above and below the point of junction of the horizontal and vertical bores, a disk valve on each of said valve seats, there being an annular slot in the wall of the chambered member above each disk valve, and a limit device above each valve, each limit device comprising a wire suitably formed to present a series of downwardly projecting contact points and a series of wall engaging portions entered into the corresponding slot of the wall, substantially as described.

4. In a device of the class described, the combination with the hose, of a cylindrical chambered member having a vertical bore extending throughout its length, a sidewise projecting arm having a horizontal bore in communication with the vertical bore, a horizontal circular valve seat within the casing at a point below the point of junction of the horizontal and vertical bores, another horizontal circular valve seat in the casing at a point above the aforesaid point of junction, and a third horizontal circular valve seat within the casing at a point above the last mentioned valve seat, the valve seats being of progressively increasing diameter from the first mentioned valve seat to the last mentioned valve seat and a disk valve located on each of said valve seats, each disk valve being smaller in size than all of the valve seats above it to thereby permit the progressive insertion of the valves into position on their respective seats, substantially as described.

PAUL A. R. CONRAD.

Copies of this patent may be obtained for five cents each, by addressing the "Commissioner of Patents, Washington, D. C."